(12) United States Patent
Allemand

(10) Patent No.: US 7,735,229 B2
(45) Date of Patent: Jun. 15, 2010

(54) LEVEL TOOL

(76) Inventor: James S. Allemand, 11746 Wind Dance Dr., Mokena, IL (US) 60448

( * ) Notice: Subject to any disclaimer, the term of this patent is extended or adjusted under 35 U.S.C. 154(b) by 0 days.

(21) Appl. No.: 12/099,985

(22) Filed: Apr. 9, 2008

(65) Prior Publication Data

US 2008/0250662 A1  Oct. 16, 2008

Related U.S. Application Data

(60) Provisional application No. 60/922,750, filed on Apr. 10, 2007.

(51) Int. Cl.
*G01C 9/32* (2006.01)
(52) U.S. Cl. .......................................... 33/348; 33/379
(58) Field of Classification Search .................. 33/348, 33/348.2, 379–390
See application file for complete search history.

(56) References Cited

U.S. PATENT DOCUMENTS

| | | | |
|---|---|---|---|
| 2,639,514 A * | 5/1953 | Garrison | .................. 33/348 |
| 3,871,110 A * | 3/1975 | Gutowski et al. | .............. 33/379 |
| 3,878,618 A | 4/1975 | Freeman | |
| 3,992,841 A | 11/1976 | Ward, Jr. | |
| 4,876,798 A * | 10/1989 | Zimmerman | ............... 33/348.2 |
| 4,917,490 A | 4/1990 | Schaffer et al. | |
| 5,025,567 A * | 6/1991 | McWilliams et al. | ....... 33/348.2 |
| 5,207,004 A | 5/1993 | Gruetzmacher | |
| 5,339,530 A | 8/1994 | Wright | |
| 6,026,581 A | 2/2000 | Gruetzmacher | |
| 6,041,510 A | 3/2000 | Huff | |
| 6,122,833 A | 9/2000 | Lorocco | |
| 6,441,908 B1 | 8/2002 | Johnston et al. | |
| 7,117,606 B2 | 10/2006 | Brown | |
| 7,117,608 B2 * | 10/2006 | Zugel et al. | .................. 33/348 |
| 7,263,778 B2 * | 9/2007 | Lang et al. | .................... 33/379 |
| 2005/0045637 A1 | 3/2005 | Rohr et al. | |

OTHER PUBLICATIONS

PCT International Search Report/Written Opinion of the International Searching Authority (the European Patent Office) regarding Application No. PCT/US08/59718, dated Aug. 1, 2008, 10 pages.

* cited by examiner

*Primary Examiner*—G. Bradley Bennett
(74) *Attorney, Agent, or Firm*—Brinks Hofer Gilson & Lione

(57) ABSTRACT

A level tool comprising a body including at least one vial opening that defines a bore surface and a vial positioned at least partially within the at least one vial opening and directly supported by the body, wherein the bore surface is configured to enhance the visibility of the vial and the bore surface comprises a reflective surface finish.

24 Claims, 3 Drawing Sheets

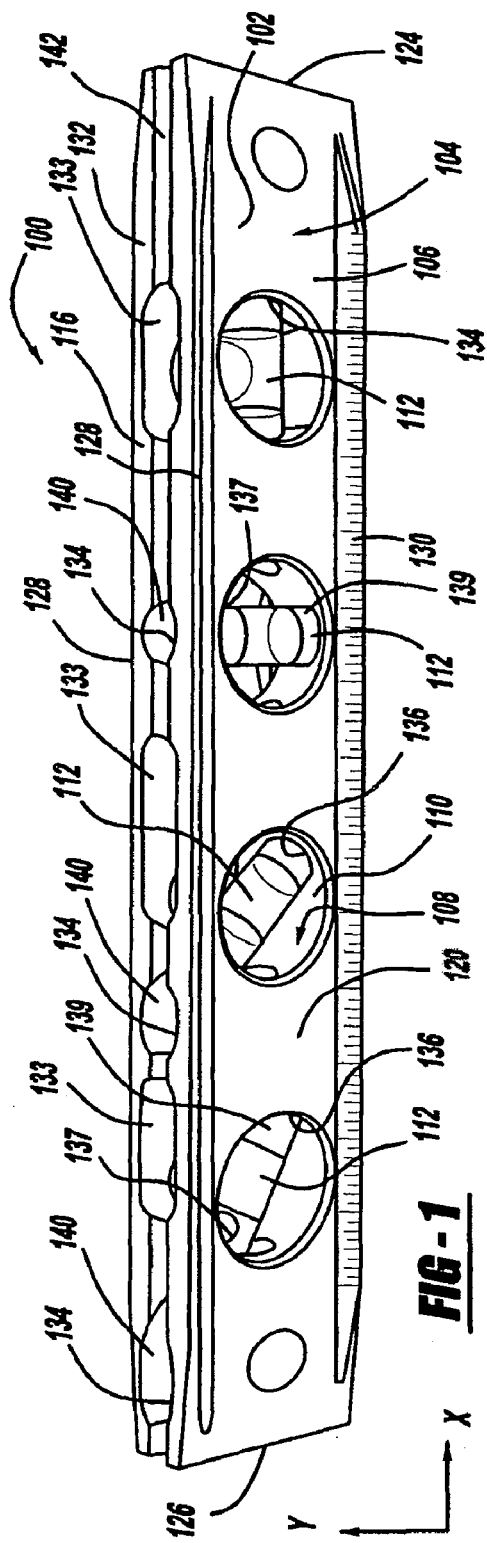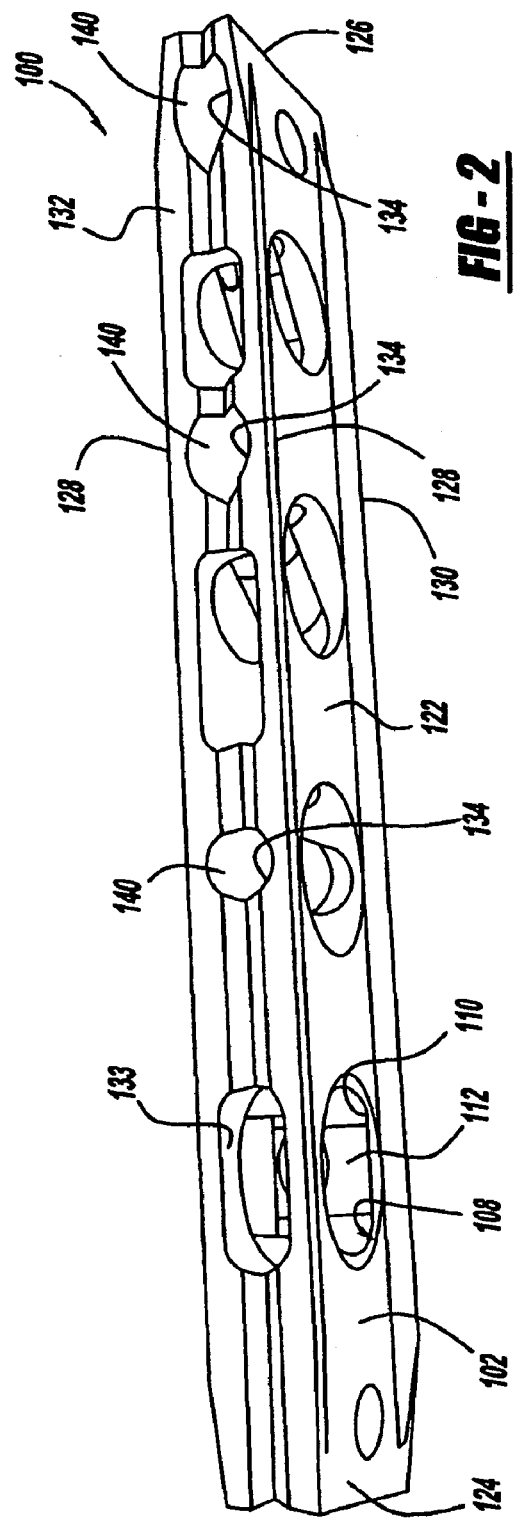

LEVEL TOOL

RELATED APPLICATIONS

The present patent document claims the benefit of the filing date under 35 U.S.C. §119(e) of Provisional U.S. Patent Application Ser. No. 60/922,750, filed Apr. 10, 2007, which is hereby incorporated by reference.

BACKGROUND

The invention relates generally to a level tool for indicating the orientation of a structure or surface. More specifically, the invention relates to a level tool configured to support one or more vials and to enhance the visibility of the vials.

As is known in the art, level tools are used to indicate the orientation of a particular structure or surface with respect to a reference axis, such as a horizontal reference axis that is generally parallel to the horizon, a vertical reference axis that is perpendicular to the horizontal axis and is generally aligned with the direction of the force of gravity, or a reference axis having another orientation.

A typical level tool generally includes an elongated body that defines a pair of opposing, generally parallel working surfaces and one or more vial openings with bubble vials secured therein. The vials may be aligned in different directions relative to the working surfaces for indicating the orientation of a structure. For example, a plumb vial may be aligned in a direction perpendicular to the working surfaces, and a level vial may be aligned in a direction parallel to the working surfaces. As a result, when one of the working surfaces engages a generally vertical structure, an air bubble is generally centered within the plumb vial. Similarly, when one of the working surfaces engages a generally horizontal structure, an air bubble is generally centered within the level vial.

Various assemblies for mounting the vials in the vial openings are also known, including, for example, plastic or rubber inserts, webs, plates, and rings that are configured to be securely disposed in the vial openings and to hold the vials therein. Such vial mounting assemblies are commonly used when the body of the level tool is an extruded frame with a hollow cross-sectional shape, although it will be recognized that they can also be used when the level tool body has a generally solid cross-sectional shape. It is known in the art to provide vial mounting assemblies of different colors, for example, so as to outline the vials enclosed therein.

However, hollow frames may be susceptible to bending, denting, or breaking when subject to some working conditions. Additionally, the plastic inserts may become dislodged from the body of the level tool during use, thereby exposing the interior of the level tool to moisture and contaminants and/or separating the vials from the body. Furthermore, the plastic inserts may add to manufacturing costs and/or increase the complexity of manufacturing the level tool.

Some currently known level tools include a substantially solid aluminum alloy body having vials openings formed through the body and vials secured directly in the vial openings. These level tools typically have treated outer surfaces for improving the scratch resistance characteristics, the appearance, or the overall part life of the level tool. For example, some currently known aluminum alloy level tools are anodized and/or painted to improve the aesthetics of the level tool or to correspond to the manufacturer's trade dress. However, when the vials are supported directly in the vial openings, the finish on the outer surface of the level tool may decrease the visibility of the liquid and the air bubble within the vials if the finish is used in the area surrounding the vials or in a line of sight thereof.

Solid body levels also commonly include passageways connected to the vial openings for installation and further support of the vials. Typically, the ends of the passageways are filled with silicone, wax, or glue to prevent the vials from migrating out of the passageways. However, use of such materials may increase assembly costs or lead to inconsistent or varying product quality when the level tool is mass produced. Additionally, these materials are difficult to remove for maintenance or replacement of the vials, thereby potentially increasing costs of maintaining the level tool.

It is therefore desirable to provide a level tool having a body with a suitable strength and durability, an aesthetically-pleasing appearance, and a readily-visible vial that is effectively secured with respect to the level tool body.

BRIEF SUMMARY

In one aspect of the present invention, there is provided a level tool comprising a body including at least one vial opening that defines a bore surface and a vial positioned at least partially within the at least one vial opening and directly supported by the body. The bore surface is configured to enhance the visibility of the vial and comprises a reflective surface finish.

In another aspect of the invention, there is provided a method of manufacturing a level tool comprising the steps of: (a) forming a body of the level tool; (b) forming at least one vial opening in the body, wherein the vial opening defines a bore surface of the body; (c) applying a colored finish to at least a portion of the body; and (d) providing a reflective surface finish on at least a portion of the bore surface.

Further objects, features, and advantages of the present invention will become apparent from consideration of the following description and the appended claims when taken in connection with the accompanying drawings.

BRIEF DESCRIPTION OF THE DRAWINGS

FIG. 1 is a front perspective view showing the top and front side walls of a level embodying the principles of the present invention;

FIG. 2 is another perspective view showing the top and rear side walls of the level shown in FIG. 1;

DETAILED DESCRIPTION

Figure 3:
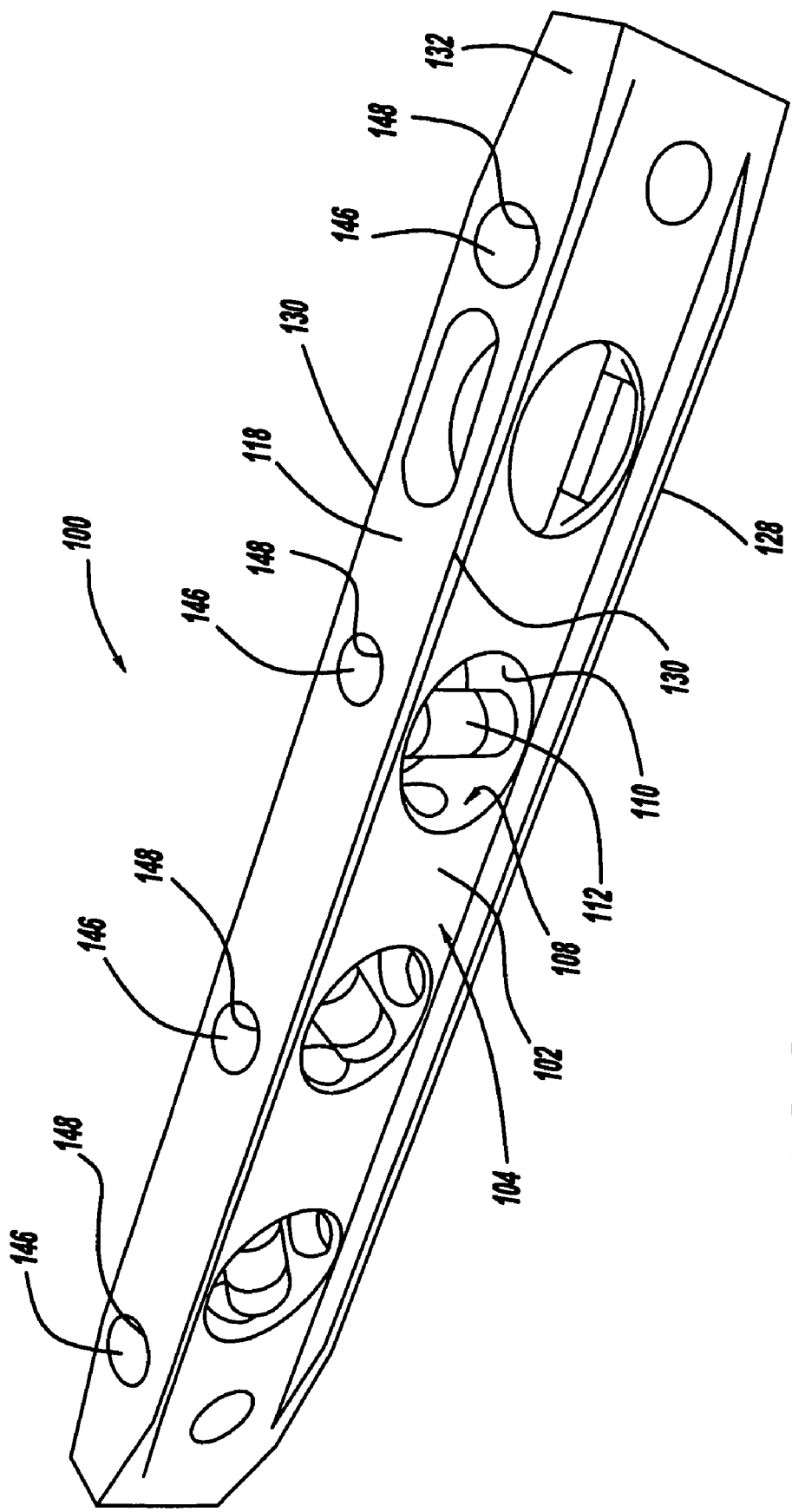
FIG. 3 is another perspective view showing the bottom wall and rear walls of the level shown in FIG. 1.
Figure 4:
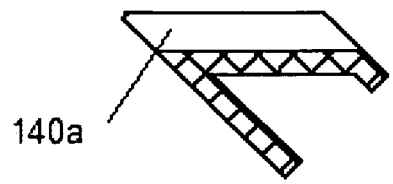
FIG. 4 is a side view of a plug for further securing vials within the vial openings of the level shown in FIG. 1.
Figure 5:
FIG. 5 is a front view of the plug shown in FIG. 4.
Figure 6:
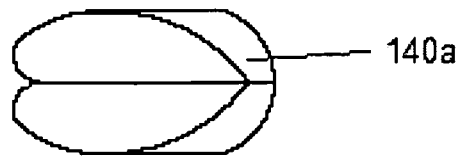
FIG. 6 is a top view of the plug shown in FIG. 4.
Figure 7:
FIG. 7 is a side view of another plug for further securing vials within the vial openings of the level shown in FIG. 1.
Figure 9:
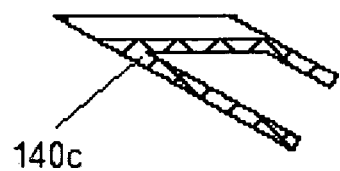
FIG. 9 is a side view of another plug for further securing vials within the vial openings of the level shown in FIG. 1.
Figure 10:
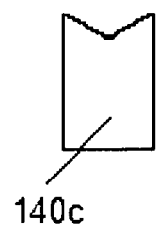
FIG. 10 is a front view of the plug shown in FIG. 9.
Figure 8:
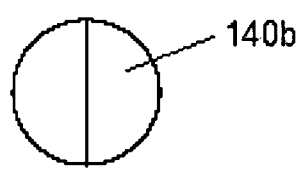
FIG. 8 is a top view of the plug shown in FIG. 7.
Figure 11:
FIG. 11 is a top view of the plug shown in FIG. 9.

Referring now to the present invention, FIGS. 1-3 show a level tool having one or more vials directly supported by the body of the level tool in accordance with the principles of the present invention. It will be understood that the level tool may include additional features not shown in the present embodiment, such as a pair of end caps positioned on opposing ends of the level tool, hand grip openings and hand grip inserts for gripping the level tool, a laser diode for generating a laser beam along the structure or surface, or any other feature suitable for use in a level tool.

FIG. 1 shows a level tool embodiment 100 for indicating the orientation of a structure with respect to a reference axis, such as a horizontal axis, a vertical axis, or another axis. The level tool 100 generally includes a body 102 having a generally solid cross-section throughout its overall length, except for openings, passageways, and indentations formed or machined into or from the body 102. The body 102 preferably is made of an aluminum alloy, but any other suitable material may be used, such as other metal alloys and plastic or composite materials. One or more vial openings 110 are formed in the body 102, each of which contains a vial 112. The body 102 is configured to support the vials 112 directly within the vial openings 110 and to enhance the visibility of the vials 112, as described below.

The body 102 includes a pair of top and bottom walls 116, 118 extending between a pair of oppositely facing ends 124, 126 (FIGS. 1 and 2) and a pair of oppositely facing side walls 120, 122 connected between the top and bottom walls 116, 118 (FIGS. 1, 2 and 3). The top wall 116 includes a V-shaped groove 142 that extends along its longitudinal length to facilitate placement on a pipe or a conduit. In the present embodiment, the body 102 has a generally I-shaped cross-sectional shape. Specifically, the top wall 116 and the bottom wall 118 cooperate with the side walls 120, 122 to define, respectively, an upper pair of opposing flanges 128 and a lower pair of opposing flanges 130 that extend along the longitudinal length of the central portion of the body 102. It will be understood, however, that the cross-sectional profile of the body 102 can have any other suitable shape, for example, a generally rectangular cross-sectional shape. Further, each pair of flanges 128, 130 may be tapered near the ends 124, 126 of the body 102, as shown in FIG. 2. If desired, distance marking indicia can also be formed along the lower pair of opposing flanges 130, for example, in metric and English units, and with numerals to indicate the distance away from a starting indicia on each of the flanges 130.

The top and bottom walls 116, 118 cooperate with the side walls 120, 122 to define an outer surface 104 of the body 102. The outer surface 104 of the body 102 has at least one treated portion 106, for example, to improve the aesthetic appearance or durability of the level tool 100. In the present embodiment, the treated portion 106 of the body 102 preferably has a colored aluminum anodized finish, which can be obtained using any suitable anodization process, such as chromic acid anodization, sulfuric acid anodization, or hardcoat anodization, and any suitable coloring process, such as electrolytic coloring or organic dyeing. For example, the treated portion 106 may have a relatively dark color, such as blue. More specifically, the treated portion 106 may be aqua blue in color and/or may have a hex code of 00CCCC.

Alternatively, it will be understood that the treated portion 106 may be formed by powder coating, painting, or any other method suitable for applying a coating to an aluminum alloy surface. In addition, although the level tool 100 shown in FIGS. 1-3 includes an outer surface 104 that is substantially completely covered by the treated portion 106, the treated portion 106 may alternatively comprise a smaller or greater percentage of the outer surface 104 area. As yet another alternative, the outer surface 104 may include a plurality of treated portions 106 having varying colors.

The outer surface 104 also includes one or more portions defining one or more working surfaces 132, which contact a structure in a generally flush engagement when the level tool 100 is used to indicate the orientation of the structure. The working surfaces 132 may be defined at least in part by the treated portion 106. In the present embodiment, a working surface 132 is defined by the outer surface of the bottom wall 118. Additionally, the top and bottom walls 116, 118 are preferably parallel with each other such that the outermost surface of the top wall 116 defines a second working surface 132. Preferably, the working surfaces 132 are milled or otherwise machined to provide, for example, improved accuracy and level contact with a structure.

As mentioned above, the body 102 of the level tool 100 defines a plurality of vial openings 110 that receive the vials 112 therein. Each of the vial openings 110 extends completely through the body 102 between the side walls 120, 122 to allow a user to view the vials 112, as shown in FIGS. 1-3. In the present embodiment, the level tool 100 includes four vial openings 110 that are evenly spaced along the longitudinal length of the body 102. Two of the vial openings 110 support a pair of vials 112 that are respectively mounted parallel and perpendicular to the working surfaces 132 so that the level 100 can indicate the orientation of a structure with respect to either the horizontal axis or the vertical axis. The other vial openings 110 support a pair of vials 112 that are mounted at a thirty degree angle and a forty-five degree angle relative to the working surfaces 132.

As mentioned above, the vials 112 are directly supported by the body 102 of the tool 100 in the vial openings 110 rather than being supported by inserts or other separate components that are disposed the vial openings 110. This configuration creates a more secure and a less complex connection between the body 102 and the vials 112, thereby potentially improving the durability of the level tool 100 and reducing manufacturing costs.

In particular, a plurality of passageways 134 are formed in the body 102 such that at least one passageway 134 intersects each of the vial openings 110 and is axially aligned with the vial 112 positioned within the respective vial opening 110. The passageways 134 each have a diameter and shape corresponding to the diameter and shape of the vials 112 such that the vials 112 are able to be inserted into the vial openings 110 via the passageways 134. The vials 112 each have a length sufficiently longer than the diameter of the vial openings 110 such that a first end 137 of each vial extends into one of the passageways 134 and is supported therein once the vials 112 are inserted across the vial openings 110.

In addition, because the level tool 100 has a substantially solid body 102, each vial opening 110 defines a bore surface 108. Each bore surface 108 has an indentation 136 formed therein directly opposite the respective passageway 134 that intersects the vial opening 110. In this way, each indentation 136 is in alignment with a respective vial 112 and a respective passageway 134 for receiving and supporting the second end 139 of the respective vial 112. The indentations 136 each have a diameter and shape corresponding to the diameter and shape of the vials 112 so that the second ends 139 of the vials securely rest directly against the body 102 within the vial openings 110 once the vials 112 are inserted into the vial openings 110.

As mentioned above, the bore surfaces 108 of the body 102 are configured so as to enhance the visibility of the vials 112 secured in the respective vial openings 110. Preferably, the bore surfaces 108 have a surface finish suitable for reflecting light onto the vials 112 and, more preferably, a surface finish with better light reflecting properties than the surface finish of the treated portion 106. For example, the bore surfaces 108 may be untreated light reflecting surfaces, such as untreated metallic surfaces, that have a natural reflective surface finish when machined and/or polished. Alternatively, the bore surfaces 108 may be treated light reflecting surfaces, such as surfaces that have been coated, painted or dyed a relatively light color to create a surface finish suitable for reflecting light onto the vials 112. In the present embodiment, bore surfaces 108 of the aluminum alloy body 102 are machined surfaces having a generally smooth and reflective aluminum finish. Such a surface finish is more suitable for reflecting light onto the vials 112 than the colored anodized finish applied to the treated portion 106 of the body 102.

The body 102 also includes a plurality of viewing windows 133 formed in the top and bottom walls 116 and 118 and intersecting one or more of the respective vial openings 110. In this way, for example, when the working surface 132 defined by the outer surface of the bottom wall 118 engages a structure, a user can view one or more of the vials 112 while facing the top wall 116 through the viewing windows 133 formed in the top wall 116.

The level tool 100 also includes a plurality of plugs 140 for further securing the vials 112 within the vial openings 110, as shown in FIGS. 1-2. The plugs 140 are each positioned within one of the passageways 134 to prevent the vials 112 from undesirably migrating through the passageways 134 during use of the level tool 100. Preferably, the plugs 140 are each configured to form an interference fit with the passageways 134, but the plugs 140 may additionally or alternatively be secured to the body 102 via an adhesive or other fastening means. Additionally, the plugs 140 may be pre-formed to conform to the cross-sectional profile of the top wall 116, including the groove 142. In this embodiment, for example, the level tool 100 includes three plugs 140a, 140b, and 140c, as shown in FIGS. 4-11. Each of the plugs 140a, 140b, and 104c has a substantially cylindrical cross-sectional shape and defines a groove at one end thereof that is generally flush with the groove 142 formed on the top wall 116 of the body 102. The plugs 140 are each preferably made of an organic polymer, rather than glue, wax, or silicone. For example, the plugs 140 are preferably made of one of the following materials: polyethylene (PE), polypropylene (PP), or polyvinyl chloride (PVC).

As shown in FIG. 3, the level tool 100 may also include a plurality of magnetic inserts 146 supported by the body 102 for releasably securing the level tool to a ferrous component to be measured. For example, the magnetic inserts 146 are each positioned within a bore 148 formed in the bottom wall 118. The magnetic inserts 146 may be secured within the bores 148 via an interference fit or via an adhesive or other securing means. The magnetic inserts 146 are preferably of a type and size suitable for temporarily securing the level tool 100 to a ferrous component to be measured via a magnetic attractive force. More specifically, the magnetic inserts 146 preferably each have an effective strength such that the magnetic inserts are able to collectively support the weight of the level tool 100 when the level tool 100 engages a vertically oriented ferrous structure, while not significantly hindering removal of the level tool 100 from the ferrous structure when desired.

In the present embodiment, the level tool 100 is preferably manufactured by machining an aluminum alloy billet into the general shape of the body 102 shown in the FIGS. 1-3. More specifically, the body 102 is first CNC machined or formed from a solid aluminum alloy billet, for example, 6000 series aluminum alloy, to include the flanges 128, 130, the vial openings 110, the viewing windows 133, the passageways 134, the indentations 136, and the groove 142. Alternatively, it will be understood that the body 102 may be formed from an aluminum alloy by an extrusion process, casting process, or any other suitable process. Then, the body 102 is anodized to have colored anodized finish covering all of the exposed surfaces of the body, including the outer surface 104 and bore surfaces 108.

Next, the bore surfaces 108, including the indentations 136, and the portions of the outer surface 104 defining the working surfaces 132 are each milled to remove the anodized finish. The bore surfaces 108, in particular, are milled to have a generally smooth and reflective aluminum finish that is suitable for reflecting light onto the vials 112, which may be lighter in color than the anodized finish. Alternatively, the anodized finish may be removed from the bore surfaces 108 by other suitable methods, such as laser etching. Thus, in this embodiment, the vial openings 110 are machined before the body 102 is anodized, and the anodized finish is later removed from the bore surfaces 108 by an appropriate method.

The body 102 may also undergo laser etching or another suitable process to form distance marking indicia, including ruler marks and numbers, or other desired writing or symbols, on the side walls 120, 122. Then, the vials 112 are inserted within the vial openings 110 via the passageways 134 such that their second ends 139 are received in the respective indentations 136 formed in the bore surfaces 108 and their first ends 137 extend into the respective passageways 134. Finally, once the vials 112 are inserted into the vial openings 110, the plugs 140 are inserted in the passageways 134 so as to close the passageways and secure the vials 112 within the vial openings 110.

In another embodiment, the bore surfaces 108 are covered with a protective cover or coating before the body 102 is anodized, powder coated, or painted to form the treated portion 106. In particular, the level tool 100 is manufactured by machining an aluminum alloy billet into the shape of the body 102, including the flanges 128, 130, the vial openings 110, the viewing windows 133, the passageways 134, the indentations 136, and the groove 142. Also, the bore surfaces 108 are milled to have a generally smooth and reflective aluminum finish that is suitable for reflecting light onto the vials 112. Before the body 102 is anodized, powder coated, or painted to form the treated portion 106, the bore surfaces 108 are covered with protective covers to prevent the bore surfaces from being treated. In this way, the bore surfaces 108 retain their smooth and reflective aluminum finish.

In another embodiment, the vial openings 110 are machined after the body 102 is anodized. In particular, the level tool 100 is manufactured by machining an aluminum alloy billet into the general shape of the body 102, except for at least the vial openings 110. The body 102 is then anodized, powder coated, or painted to form the treated portion 106. Next, the vial openings 110, and possibly also the viewing windows 133, the passageways 134, and the working surfaces 132 are each machined and/or milled in the body 102. In this way, the bore surfaces 108 can be formed with a smooth and reflective aluminum finish that is suitable for reflecting light onto the vials 112.

In yet another embodiment, the bore surfaces 108 are coated and/or painted to provide a finish suitable for reflecting light onto the vials 112 before the body 102 is anodized, powder coated, or painted to form the treated portion 106. Then, the bore surfaces 108 are covered with a protective cover or coating before the body 102 is anodized, powder coated, or painted to form the treated portion 106. As yet another alternative, the bore surfaces 108 are coated and/or painted to provide a finish suitable for reflecting light onto the vials 112 after the body 102 is anodized, powder coated, or painted to form the treated portion 106.

While the present invention has been described in terms of preferred embodiments, it will be understood, of course, that the invention is not limited thereto since modifications may be made to those skilled in the art, particularly in light of the foregoing teachings.

What is claimed is:

1. A level tool comprising:
   a body including at least one vial opening defining a bore surface; and
   a vial positioned at least partially within the at least one vial opening and directly supported by the body,
   wherein the bore surface is configured to enhance the visibility of the vial and the bore surface comprises a reflective surface finish.

2. The level tool of claim 1 wherein the reflective surface finish is untreated reflective surface finish.

3. The level tool of claim 1 wherein the bore surface is machined surface comprising an untreated reflective surface finish.

4. The level tool of claim 3 wherein the machined surface is a machined aluminum surface comprising a generally smooth and reflective aluminum finish.

5. The level tool of claim 1 wherein the reflective surface finish is a treated reflective surface finish.

6. The level tool of claim 5 wherein the treated reflective surface finish is selected from the group consisting of a coated reflective surface finish, a painted reflective surface finish and a dyed reflective surface finish.

7. The level tool of claim 1 wherein an outer surface of the body has at least one treated portion comprising a colored finish and the reflective surface finish of the bore surface is more reflective than the colored finish.

8. The level tool of claim 1 further comprising:
   at least one passageway formed in the body such that the at least one passageway intersects the at least one vial opening and is axially aligned with the vial; and
   a plug positioned within the at least one passageway to secure the vial, the plug being pre-formed at one end thereof to generally conform to a cross-sectional profile of a top wall of the body.

9. The level tool of claim 8 wherein the plug is made of an organic polymer.

10. The level tool of claim 8 wherein the plug is configured to form an interference fit with the at least one passageway.

11. A method of manufacturing a level tool comprising the steps of:
    (a) forming a body of the level tool;
    (b) forming at least one vial opening in the body, wherein the vial opening defines a bore surface of the body;
    (c) applying a colored finish to at least a portion of the body; and
    (d) providing a reflective surface finish on at least a portion of the bore surface.

12. The method of claim 11 wherein step (b) is performed before step (c).

13. The method of claim 11 wherein step (b) is performed after step (c).

14. The method of claim 12 wherein step (c) is performed before step (d).

15. The method of claim 12 further comprising the step of (e) covering the reflective finish, wherein step (c) is performed after step (d) and step (e).

16. The method of claim 11 wherein the forming in step (a) is performed at least in part by machining, extruding, or casting an aluminum alloy billet.

17. The method of claim 11 wherein the forming in step (b) is performed at least in part by a machining process.

18. The method of claim 11 wherein the applying in step (c) is performed at least in part by an anodizing process, a coating process or a painting process.

19. The method of claim 11 wherein the applying in step (c) includes applying the colored finish to the at least a portion of the bore surface and the providing in step (d) is performed at least in part by machining the at least a portion of the bore surface to remove the colored finish and to form the reflective surface finish.

20. The method of claim 19 wherein the reflective surface finish is a generally smooth and reflective aluminum finish.

21. The method of claim 11 wherein the applying in step (c) includes applying the colored finish to the at least a portion of the bore surface and the providing in step (d) is performed at least in part by laser etching the at least a portion of the bore surface to remove the colored finish.

22. The method of claim 11 wherein the providing in step (d) is performed at least in part by coating the at least a portion of the bore surface to form a reflective surface finish.

23. The method of claim 11 wherein the providing in step (d) is performed at least in part by painting the at least a portion of the bore surface to form a reflective surface finish.

24. The method of claim 11 further comprising the steps of:
    (f) forming at least one passageway in the body that intersects the at least one vial opening;
    (g) inserting a vial in the at least one vial opening via the at least one passageway; and
    (h) inserting a plug in the passageway so as to close the passageway and secure the vial within the at least one vial opening, wherein the plug is pre-formed at one end thereof to generally conform to a cross-sectional profile of a top wall of the body.

* * * * *